United States Patent
Jarry et al.

(10) Patent No.: US 11,378,338 B2
(45) Date of Patent: Jul. 5, 2022

(54) METHOD FOR OPERATING A BATCH FURNACE COMPRISING THE PREHEATING OF A FLUID UPSTREAM OF THE FURNACE

(71) Applicant: L'Air Liquide, Societe Anonyme pour l'Etude et l'Exploitation des Procedes Georges Claude, Paris (FR)

(72) Inventors: Luc Jarry, Beaufai (FR); Peter Van Kampen, Canton, GA (US)

(73) Assignee: L'Air Liquide, Societe Anonyme Pour L'Etude Et L'Exploitation Des Procedes Georges Claude, Paris (FR)

(*) Notice: Subject to any disclaimer, the term of this patent is extended or adjusted under 35 U.S.C. 154(b) by 629 days.

(21) Appl. No.: 16/316,235

(22) PCT Filed: Jun. 29, 2017

(86) PCT No.: PCT/FR2017/051740
§ 371 (c)(1),
(2) Date: Jan. 8, 2019

(87) PCT Pub. No.: WO2018/007721
PCT Pub. Date: Jan. 11, 2018

(65) Prior Publication Data
US 2019/0331423 A1    Oct. 31, 2019

(30) Foreign Application Priority Data

Jul. 8, 2016  (FR) ...................................... 1656588

(51) Int. Cl.
*F27D 17/00*    (2006.01)
*F23D 14/66*    (2006.01)
(Continued)

(52) U.S. Cl.
CPC ........... *F27D 17/004* (2013.01); *F23D 14/66* (2013.01); *F23L 15/045* (2013.01); *F27B 3/205* (2013.01);
(Continued)

(58) Field of Classification Search
CPC .......... F23D 14/66; F23L 15/045; F27B 3/20; F27B 3/205; F27B 3/22; F27B 3/263;
(Continued)

(56) References Cited

U.S. PATENT DOCUMENTS 5,807,418 A * 9/1998 Chamberland ......... F23L 7/007
                                                            65/134.4
7,062,912 B2 * 6/2006 Penfornis .............. C03B 5/2353
                                                            60/649

(Continued)

FOREIGN PATENT DOCUMENTS

FR       3 053 767       1/2018
WO    WO 2006/054015    5/2006

OTHER PUBLICATIONS

International Search Report and Written Opinion for PCT/FR2017/051740, dated Oct. 13, 2017.

*Primary Examiner* — Steven B McAllister
*Assistant Examiner* — Benjamin W Johnson
(74) *Attorney, Agent, or Firm* — Christopher J. Cronin

(57) ABSTRACT

Furnace operation includes consecutive cycles of a heating step, a stopping step and a restarting step. The fuel and/or the oxidizing agent is preheated upstream of the furnace by indirect exchange with the discharged fumes through a medium passing through a chamber. A first wall separates the fumes from the medium in the chamber. The fuel and/or oxidizing agent is separated from the medium in the chamber by a second wall. During restarting, the medium's flow rate Dm is regulated to limit the heating rate of the first wall until it reaches the operational temperature at an end thereof.

16 Claims, 2 Drawing Sheets

(51) Int. Cl.
    *F23L 15/04*     (2006.01)
    *F27B 3/20*     (2006.01)
    *F27B 3/26*     (2006.01)
    *F27B 3/22*     (2006.01)
    *F27B 7/34*     (2006.01)
    *F27B 7/36*     (2006.01)

(52) U.S. Cl.
    CPC ............... *F27B 3/263* (2013.01); *F27B 3/20* (2013.01); *F27B 3/22* (2013.01); *F27B 7/34* (2013.01); *F27B 7/36* (2013.01); *F27D 2017/007* (2013.01); *Y02E 20/34* (2013.01)

(58) Field of Classification Search
    CPC .. F27B 7/34; F27B 7/36; F27D 17/004; F27D 2017/007; Y02E 20/34
    USPC .......................................................... 431/11
    See application file for complete search history.

(56) References Cited

U.S. PATENT DOCUMENTS

| | | | | |
|---|---|---|---|---|
| 9,221,703 B2* | 12/2015 | Douxchamps | ............ | C03B 5/04 |
| 2007/0141522 A1* | 6/2007 | Borders | ................. | F23C 6/047 |
| | | | | 431/354 |
| 2010/0081103 A1* | 4/2010 | Kobayashi | .............. | C03B 5/235 |
| | | | | 432/1 |

\* cited by examiner

METHOD FOR OPERATING A BATCH FURNACE COMPRISING THE PREHEATING OF A FLUID UPSTREAM OF THE FURNACE

CROSS-REFERENCE TO RELATED APPLICATIONS

This application is a § 371 of International PCT Application PCT/FR2017/051740, filed Jun. 29, 2017, which claims § 119(a) foreign priority to French patent application FR 1656588, filed Jul. 8, 2016.

BACKGROUND

Field of the Invention

The present invention relates to the preheating of a fluid upstream of a furnace by heat exchange with flue gases discharged from the furnace.

Related Art

It is known to use the heat present in the discharged flue gases to preheat combustion air upstream of the furnace by means of regenerators operating alternately: (a) the flue gases being first sent through a regenerator so as to heat the regenerator and (b) the combustion air then being heated by passing through the regenerator thus heated. The discharged flue gases and the combustion air therefore pass through a same volume inside the regenerators, but at different moments. For safety reasons, such a method in which the hot flue gases and the fluid to be heated pass through a same volume is not suitable for preheating a fuel or an oxygen-rich oxidant.

It is also known to preheat a combustion oxidant and/or a fuel upstream of a furnace by heat exchange with the discharged flue gases in one or more heat exchangers (often referred to as recuperators) in which the discharged flue gases and the fluid to be heated circulate in separate circuits. It is then necessary to ensure the leaktightness between the circuit of the fluid to be preheated and the circuit of the discharged flue gases so as to avoid any direct contact between the flue gases and the fluid. In the present context, the expressions "thermal exchange" or "heat exchange" refer to such processes in which the hot fluid and the fluid to be heated circulate in separate circuits with no mixing or direct contact between the two fluids.

A distinction is made between direct heat exchange and indirect heat exchange. During a direct heat exchange, a fluid is heated with a hotter fluid by heat exchange across a wall that separates the fluid to be heated from the hotter fluid.

Indirect heat exchange is understood to mean a heat exchange in two steps of direct exchange via an intermediate fluid.

SUMMARY OF THE INVENTION

The company Air Liquide has developed and industrializes such a preheating technology that is particularly reliable and suitable for preheating an oxidant having a high oxygen content by indirect heat exchange between the fluid to be preheated and the flue gases discharged from the furnace. Thus, in the preheating technology of the company Air Liquide:

an intermediate fluid is heated by direct heat exchange with the flue gases across a first wall in a first step and in a second step the combustion oxygen (and where appropriate also the fuel) is (are) preheated by direct heat exchange with the intermediate fluid heated in the first step across a second wall.

Such technology is in particular described in WO 2006/054015. This technology enables considerable efficiency savings in the case of furnaces that continuously generate a flow of hot flue gases that is sufficient for preheating the oxygen and/or the fuel to a desired temperature.

For safety reasons, it is important to avoid leaks between the various circuits. Such leaks may result from a heat shock and in particular abrupt and repeated changes in temperature which are capable of embrittling the walls and the joints of the heat exchangers.

The flue gases discharged from an industrial furnace may easily reach temperatures between 600° C. and 1550° C. It is therefore advisable to bring the heat exchanger(s) slowly and gradually to their operational temperature, i.e. to gradually bring the various parts of the heat exchanger(s) to the temperature that they will have during the preheating of the fluid.

Similarly, it is advisable to bring the exchanger(s) gradually to ambient temperature when the combustion in the furnaces shut down and when there is no longer any discharge of hot flue gases from the furnace.

Such a heating up and such a cooling of the heat exchanger(s) may take a considerable time.

In industry, a distinction is made between continuous furnaces and batch furnaces.

Continuous furnaces are heated continuously throughout the entire run, which may last months, or even years.

The operation of batch furnaces, on the other hand, is characterized by repeated cycles:

a) of a heating step, during which the furnace is heated by combustion of a fuel with an oxidant, with generation of heat and hot flue gases, said hot flue gases then being discharged from the furnace through a discharge duct; and b) of a shutdown step during which the combustion of the fuel with the oxidant in the furnace and the discharge of hot flue gases from the furnace through the duct are interrupted.

This alternation between periods with and without production of hot flue gases makes the methods known for preheating a combustion reactant by heat exchange with the discharged flue gases in one or more exchangers unsuitable for implementation on a batch furnace, since they lead to high, sudden and repeated temperature variations, especially in the wall which separates the discharged flue gases from, respectively, the fluid to be heated or the intermediate fluid.

The objective of the present invention is to provide an indirect preheating technology that is suitable for batch furnaces. The objective of the present invention is more particularly to enable a reliable and effective recovery of heat from the discharged flue gases for batch furnaces by means of an indirect preheating technology For this purpose, the invention proposes a process for operating a furnace comprising a heating step during which the indirect preheating technology described above is implemented. Thus, during the heating step:

(a) a fuel and an oxidant are supplied to the furnace and the furnace is heated by combustion of the fuel with the oxidant with generation of heat and combustion flue gases, the flue gases being discharged from the furnace through a duct and (b) at least one fluid chosen from the fuel and the oxidant is preheated upstream of the furnace by means of the flue gases discharged from the furnace:

by introducing a flow rate Dm (>0) of a liquid or gaseous medium into a chamber and by heating said medium by heat exchange with the flue gases in the duct across a first wall which separates the medium in the chamber from the flue gases in the duct with a heated medium being obtained, the first wall then having a temperature referred to as "operational temperature"; and by introducing a flow rate Df (>0) of the fluid to be preheated into at least one line so as to preheat the fluid by heat exchange with the heated medium in the chamber across a second wall which separates the fluid in the at least one line from the heated medium in the chamber.

The process for operating the furnace comprises repeated cycles of the above-described heating step followed by a shutdown step and by a restarting step, the restarting step bridging between the shutdown step and the following heating step.

During the shutdown step:

the supply of the fuel and of the oxidant to the furnace and the combustion of the fuel with the oxidant in the furnace are interrupted as well as, obviously, the discharge of flue gases from the furnace through the duct.

According to the invention, from the start of each shutdown step, i.e. when the combustion of the fuel in the furnace is stopped, and throughout the entire shutdown step, the flow rate Dm of the medium in the chamber is reduced by at least 50%, preferably by at least 75% and more preferably by at least 90%. The flow rate Dm of the medium in the chamber may in particular be stopped (Dm=0) from the start of each shutdown step. By thus slowing down, or even by limiting, the cooling of the wall (first wall) which separates the discharged flue gases in the duct from the intermediate fluid, heat shocks in this first wall are avoided at the start of each shutdown step.

Also according to the invention, the combustion in the furnace of the fuel with the oxidant and the discharge of the flue gases through the duct restart at the start of the restarting step. The flow rate Dm of the medium in the chamber is simultaneously increased in a controlled manner and then regulated so as to limit the heating rate of the wall (first wall) which separates the discharged flue gases in the duct from the intermediate fluid in the chamber until the first wall reaches the operational temperature at the start of the following heating step.

The cooling rate $V_{T\downarrow}$ and the heating rate $V_{T\uparrow}$ of the first wall are defined as:

$$\frac{|\Delta T|}{|\Delta t|}$$

and are expressed in K/s.

To prevent a thermal embrittlement of the heat exchanger at the first wall, the cooling rate $V_{T\downarrow}$ and the heating rate $V_{T\uparrow}$ must not exceed their respective upper limits $V_{T\downarrow max}$ and $V_{T\uparrow max}$. Said upper limits $V_{T\downarrow max}$ and $V_{T\uparrow max}$ may be identical or different (as absolute values). They depend on the materials that form the first wall and also on the connections (for example the welds) which connect the first wall to the rest of the heat exchanger. Specifically, certain materials or combinations of materials withstand temperature changes better than others.

By regulating, in the manner described above, the flow rate Dm of the intermediate fluid during the shutdown steps and the restarting steps, it is possible to limit and to slow down the cooling of the first wall during the shutdown step, so that $V_{T\downarrow}$ does not exceed $V_{T\downarrow max}$, and also to limit the heating rate $V_{T\uparrow}$ of the first wall so that it does not exceed $V_{T\uparrow max}$ while limiting the time needed for the first wall to reach its operational temperature. The invention thus makes it possible to safely benefit from energy advantages of preheating the fuel or fuel oxidizer with the heat present in the discharged flue gases in the plant of a batch furnace while limiting the time losses linked to the necessarily controlled heating up of (the first wall of) the heat exchanger.

The criteria used for selecting the change of the flow rate Dm of the intermediate fluid during the restarting step are: to achieve a high heating rate $V_{T\uparrow}$ of the first wall while complying with the upper limit $V_{T\uparrow max}$ of said heating rate.

When the first wall is quite sensitive to heat shocks, i.e. when $V_{T\uparrow max}$ is relatively low, and/or when the temperature of the flue gases discharged from the furnace reaches a high level, which leads to a significant risk of rapid rise in temperature of the first wall, it is possible, during the restarting step, to raise the flow rate Dm of the intermediate fluid to a level above the flow rate Dm of the intermediate fluid at the start of the heating steps before reducing the flow rate Dm to the latter level at the start of the following heating step.

When, on the other hand, the risk of thermal embrittlement of the first wall is relatively low, $V_{T\uparrow max}$ is relatively high and/or the temperature of the discharged flue gases is relatively low, Dm may remain, during the restarting step, below the flow rate Dm at the start of the heating steps.

It should be noted that during the heating steps, the first wall typically has a temperature profile in the flow direction of the discharged flue gases. The expression "operational temperature" as used in the present context thus refers to the temperature of the wall at a specific location of the first wall chosen as a reference point.

According to a first embodiment, the flow rate Dm is varied during the restarting steps according to a predetermined function. This function may be predetermined experimentally or by calculation (energy balance).

According to another embodiment, the gradient (change over time) of a temperature of the first wall is detected (for example by means of a thermocouple) and the flow rate Dm is regulated as a function of the heating rate $V_{T\uparrow}$ of the first wall thus determined while complying with the criteria described above.

The heating step may be a step of heat treatment of a feedstock in the furnace, for example the melting or the reheating of a feedstock present in the furnace.

The shutdown step may include a step of (complete or partial) emptying of the furnace (discharge of the feedstock after heat treatment) followed by an introduction of a (complete or partial) new feedstock into the furnace.

As already indicated above, the second wall, which is not in direct contact with the hot flue gases discharged from the furnace, experiences smaller temperature variations. The regulation of the change in the temperature of this second wall during the operation of the furnace is therefore generally less critical.

However, it is possible to limit the temperature changes of the second wall and/or to make them more gradual, in particular during the restarting step, by supplying, during this restarting step, at least one portion of the fluid directly to the furnace without this at least one portion of the fluid passing through the at least one line of the preheating device described above. According to one possible embodiment, the fluid supplied to the furnace during the restarting step is split into two portions: a first portion and a second portion. The first portion of the fluid is supplied directly to the furnace without passing through the at least one line dedicated to said fluid. The second portion of the fluid is supplied to the furnace after having passed through the at least one line. The heat exchange between the medium in the chamber and the fluid across the second wall is then limited to the second portion of the fluid. Advantageously, the ratio between (a) the second portion and (b) the sum of the first portion and the second portion of the fluid (i.e. the total flow rate of the fluid supplied to the furnace) increases during the starting step. Preferably, at the end of the restarting step, the second portion of the fluid corresponds to a flow rate of preheated fluid which is supplied to the furnace at the start of the heating step which follows the restarting step. By thus limiting the amount of fluid which passes through the at least one line during at least the start of the restarting step, the temperature variations (cooling and reheating) of the second wall are reduced and rendered more gradual during the restarting step. According to one particular embodiment, the second portion is equal to zero at the start of the restarting step. In other words, the whole of the fluid supplied to the furnace short-circuits the at least one line of the preheating device. At the end of the restarting step, the first portion is advantageously equal to zero, i.e. the whole of the fluid supplied to the furnace passes through the at least one line of the preheating device upstream of the furnace.

Typically, a heated feedstock is discharged from the furnace and a feedstock to be heated is introduced into the furnace during the shutdown step.

The medium used as heat transfer fluid for heating the fluid by indirect exchange with the discharged flue gases is usefully a gaseous medium and in particular a gaseous medium chosen from air, nitrogen, $CO_2$ or steam. The use of air as medium is often preferable due to its availability and its innocuousness.

The process according to the invention is particularly useful when the fluid to be preheated is an oxygen-rich oxidant. Thus, the fluid to be preheated may be an oxidant with an oxygen content between 50 vol % and 100 vol %, preferably between 80 vol % and 100 vol % and more preferably of at least 90 vol %.

The invention also makes it possible to combine the preheating of several fluids to be preheated, for example of the combustion oxidant and of the fuel, each fluid to be preheated then passing through at least one line dedicated to said fluid to be preheated.

The present invention may be useful for a large number of types of batch furnaces, such as, for example:
  a rotary furnace for smelting of cast iron,
  a rotary furnace for smelting of nonferrous metals, preferably for secondary smelting of nonferrous metals,
  a tilting furnace for smelting of nonferrous metals, preferably for secondary smelting of nonferrous metals,
  a rotary or tilting furnace for smelting of enamels, or
  a furnace for smelting of metals of electric arc furnace (EAF) type, preferably for secondary smelting of metals.

The succession over time of the various steps of the cycles is advantageously regulated in an automated manner by means of a control unit.

During the heating step, the temperature to which the fluid is preheated may be regulated by regulating the flow rate of the medium inside the chamber. This flow rate of the medium inside the chamber also makes it possible to avoid large variations in the temperature of the first surface between the flue gases in the duct and the medium in the chamber and also of the second wall between the fluid in the at least one line and the medium in the chamber during a heating step. Such a process is described in the coexisting patent application FR 1656584 filed on 8 Jul. 2016 and use will advantageously be made of one of the embodiments of the preheating process described therein for the preheating of the fluid during the heating step of the process according to the present invention.

BRIEF DESCRIPTION OF THE FIGURES

The present invention and the advantages thereof are described in greater detail in the examples below, reference being made to FIGS. 1 to 3, in which.

DETAILED DESCRIPTION OF THE INVENTION

The batch furnace 1 is provided with at least one burner 2 for the combustion of a fuel with an oxygen-rich oxidant, for example an oxidant having an oxygen content of at least 97 vol %.

Figure 1:
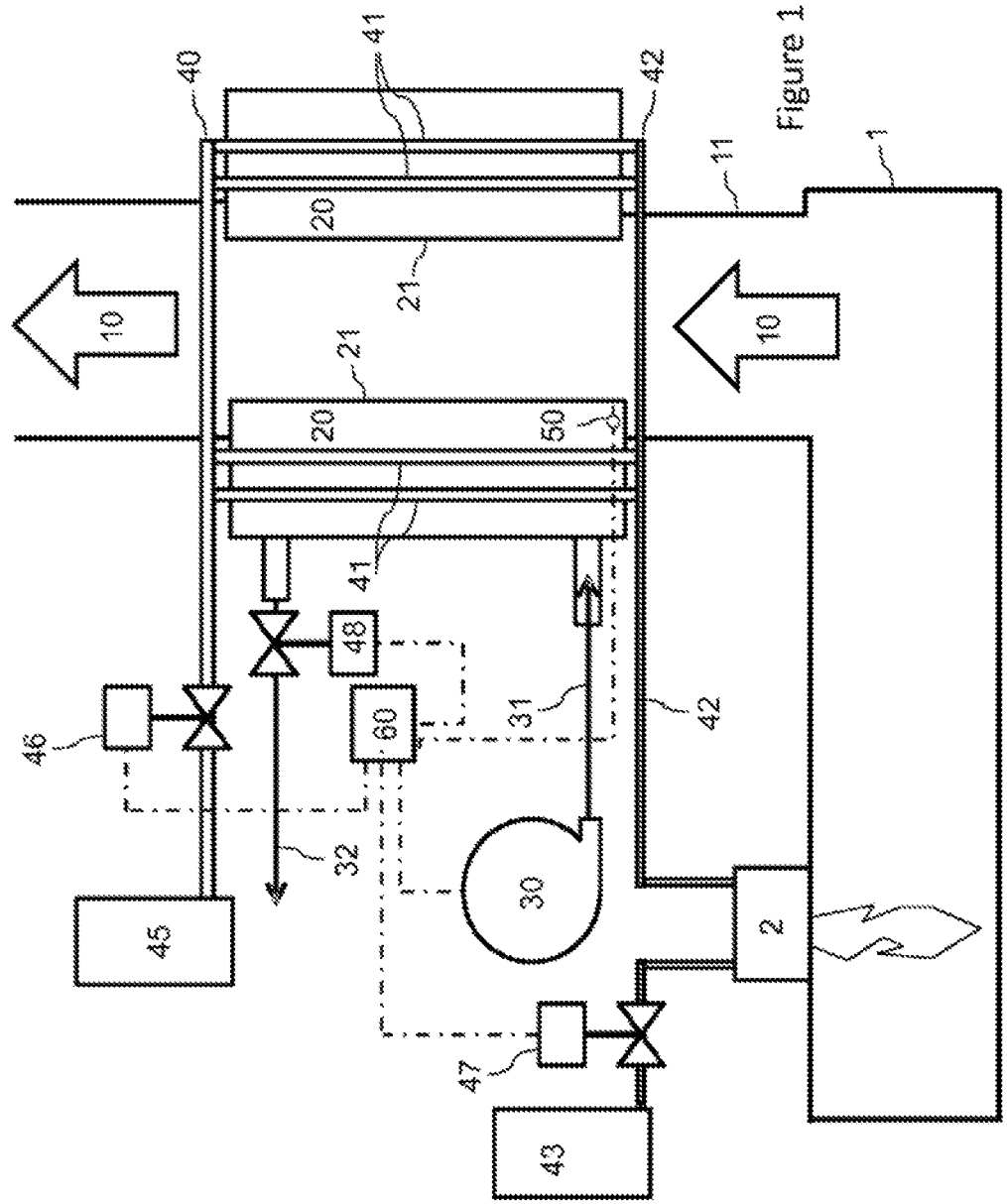
FIG. 1 which is a schematic representation of a process according to the invention and of a plant for the implementation thereof.

Although a single burner is shown in FIG. 1, the furnace may comprise several such burners 2. The position of the burner(s) 2 in the furnace depends on the type of furnace and on the process for which the furnace is intended. For example, in a rotary furnace, it is common to have a burner positioned in the longitudinal end(s) of the cylinder forming the rotary furnace. In a (non-rotary) reverberatory furnace, the burner or burners may, for example, be mounted in the roof, in the lateral walls and/or in the transverse walls.

The fuel, for example natural gas, is supplied by a fuel source 43 and the oxidant by an oxidant source 45 such as a liquefied oxygen tank or an air separation unit.

When a combustion of the fuel with the oxidant takes place in the furnace 1, which is the case during the heating step and during the restarting step, the hot flue gases 10 generated by the combustion are discharged from the furnace 1 through a duct 11.

A chamber 20 surrounds the flue gas discharge duct 11.

During the heating step, a variable-speed ambient air blower 30 introduces a flow rate Dm>0 of ambient air 31 into the chamber 20 so as to create a flow of air in the chamber 20 that is cocurrent with the flow of the flue gases 10 in the duct 11. The flow rate Dm of ambient air introduced into the chamber 20 is determined by the speed of the blower 30.

During the heating step, the flow rate Dm of air may be constant or variable. According to one embodiment, the flow rate Dm is regulated during the heating step according to a method as described in the coexisting patent application FR 1656584.

A first wall 21 physically separates the flue gases 10 in the duct 11 from the air in the chamber 20 so as to enable a heat exchange between the flue gases 10 in the duct 11 and the air in the chamber 20 across this second wall 21. The air in the chamber 20 thus absorbs a portion of the heat discharged from the furnace 1 by the flue gases with heated air thus being obtained in the chamber 20.

Still during the heating step, a flow rate Df>0 of the fluid to be preheated 40 is introduced into a bundle of lines 41 that pass through the chamber 20. The outer wall of said lines 41, referred to as "second wall", separates the fluid in the lines 41 physically from the medium (air) in the chamber 20. This wall 41 operates as heat exchange surface between the air in the chamber 20 and the fluid to be preheated so as to obtain, during the heating step, preheated fluid 42. The air in the chamber 20 therefore acts as heat transfer fluid between the hot flue gases 10 in the duct 11 and the fluid to be preheated in the lines 41. The flow rate Df of the fluid to be preheated is regulated by means of the valve 46 located on the flow line connecting the source 45 with the bundle of lines 41.

The preheated fluid 42 is then discharged from the bundle of lines 41 and conveyed to the furnace 1, and more particularly to the burner(s) 2. The air 32 is discharged from the chamber 20.

In the example illustrated, the fluid to be preheated is the combustion oxidant (fuel oxidizer) from the source 45 and flows in the lines 41 counter currently with the air in the chamber 20.

The flow rate of fuel sent to the furnace 1 (the burner(s) 2) is regulated by means of the valve 47 located on the flow line connecting the source 43 with the burner(s) 2 of the furnace 1.

The control unit 60 regulates:
  the operation of the blower 30 and therefore the flow rate of ambient air introduced into the chamber 20,
  the opening of the valve 46 and therefore the flow rate Df of oxidant 40 supplied to the bundle of lines 41 and from there to the furnace 1, and also
  the opening of the valve 47 and therefore the flow rate of fuel supplied to the furnace 1.

At the end of the heating step, for example when the feedstock present in the furnace 1 is completely molten and, where appropriate, also refined, the feedstock may be discharged from the furnace in order to enable a new feedstock to be introduced into the furnace. The combustion in the furnace 1 is then stopped and the shutdown step begins.

The control unit 60 then orders:
  the reduction of the speed and typically the shutdown of the blower 30 so that the flow rate Dm of ambient air introduced into the chamber 20 is reduced by at least 50%, or even falls to zero; the closure of the valve 47 so that there is no longer a supply of fuel to the furnace 1; and
  the closure of the valve 46 so that the flow rate Df of oxidant sent to the bundle of lines 41 and from there to the furnace 1 becomes equal to zero.

Owing to the reduction, or even the interruption, during the shutdown step, of the introduction of ambient air into the chamber 20, the cooling of the first wall 21 in the absence of hot flue gases in the duct 11 is slowed down, or even reduced when the duration of the shutdown step is short enough.

It is also noted that, owing to the shutdown of the flow of oxidant 40 inside the bundle of lines 41, the cooling of the second wall is also slowed down.

According to one particular embodiment, a valve 48 makes it possible to close the outlet of the chamber 20 so that the air present in the chamber 20 at a given moment remains inside this chamber 20.

The opening (and therefore also the closure) of the valve 48 is also regulated by the control unit 60. It is then possible to retain the heated air that is inside the chamber 20 at the end of the heating step inside the chamber 20 during the shutdown step by closing the valve 48 at the start of the shutdown step, thus slowing down even more the cooling of the first and second walls during the shutdown step.

At the start of the restarting step which follows the shutdown step, the control unit, the combustion of the fuel with the oxidant 42 is restarted.

For this purpose, the control unit 60 orders, at the start of the restarting step:
  the opening of the valve 47 so as to supply fuel to the furnace 1; and
  the opening of the valve 46 so as to send a flow rate Df>0 of oxidant to the bundle of lines 41 and from there to the furnace 1.

The hot flue gases 10 generated by the combustion in the furnace 1 during the restarting step are discharged from the furnace 1 through the duct 11 where they come into contact with and heat the first wall 21.

At the start of the restarting step, the control unit 60 increases the speed of the blower 30 or restarts it (if the blower 30 was shut down during the shutdown step) so that a regulated flow rate of ambient air Dm greater than the flow rate Dm during the shutdown step is supplied to the chamber 20 during the restarting step. In the case where the valve 48 is present and was closed during the shutdown step, the control unit also opens this valve 48 in order to enable the flow rate Dm to be discharged after it has passed through the chamber 20.

The flow rate Dm of ambient air in the chamber 20 during the restarting step slows down the heating of the first wall 21 which is also in contact with the discharged flue gases 10.

The flow rate Dm of ambient air in the chamber 20 during the restarting step is chosen so that the first wall 21 heats rapidly without the heating rate $V_{T\uparrow}$ exceeding the predetermined upper limit $V_{T\uparrow max}$.

According to one embodiment, the flow rate Dm during the restarting step varies over time according to a predetermined function.

According to another embodiment illustrated in FIG. 1, the first wall 21 is equipped with a temperature detector 50 (thermocouple) which detects a temperature of the wall 21 at a given reference point. The temperature detector 50 is connected to the control unit 60 which determines the heating rate $V_{T\uparrow}$ on the basis of the detected temperature. The control unit then regulates, by means of the blower 30, the flow rate Dm in the chamber 20 during the restarting step so as to bring this heating rate $V_{T\uparrow}$ close to its upper limit $V_{T\uparrow max}$ without however $V_{T\uparrow}$ exceeding $V_{T\uparrow max}$, for example by observing a predetermined margin between $V_{T\uparrow}$ and $V_{T\uparrow max}$.

At the end of the restarting step, when the first wall 21 has thus reached its operational temperature, the restarting step finishes and the following heating step begins.

When the process according to the invention includes the splitting of the total flow rate of the fluid supplied to the furnace 1 into two portions during the restarting step as described above, the control unit 60 advantageously regulates this splitting of the flow rate of the fluid and the change in the ratio between the second portion of the fluid (which flows through the bundle of lines 41) and the total flow rate of the fluid during the restarting step.

Figure 2:
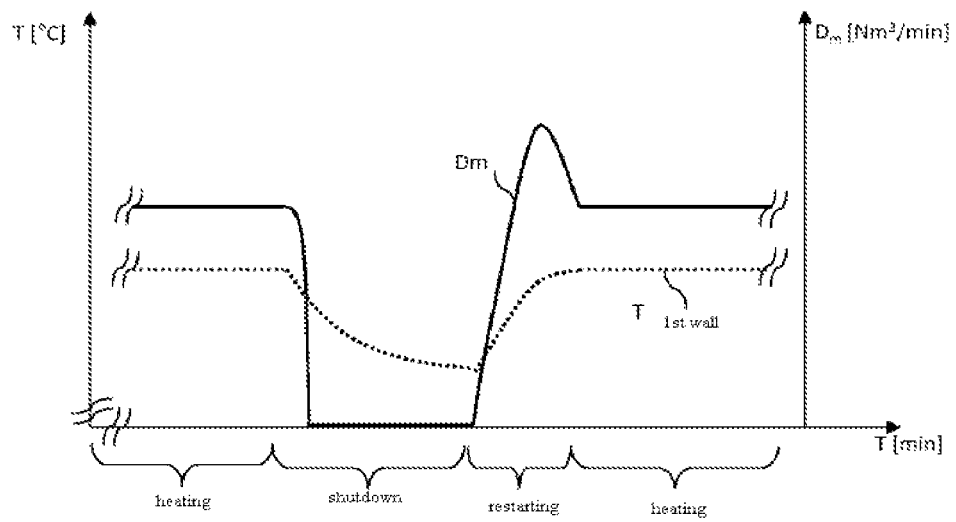
FIGS. 2 and 3 are schematic representations of the flow rate Dm and of the temperature of the first wall during the various steps of the process according to two embodiments of the process according to the invention.
Figure 3:
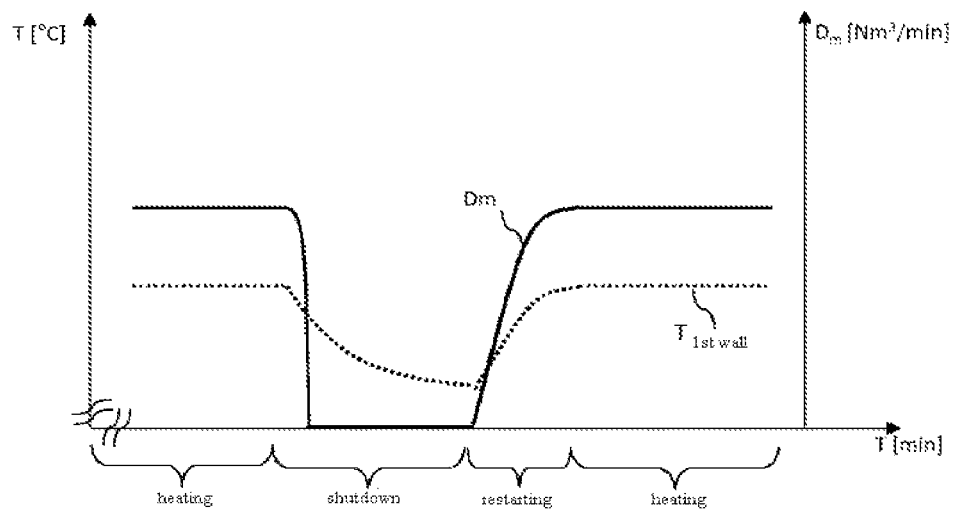

FIGS. 2 and 3 show two possible profiles of the flow rate Dm during the restarting step.

FIG. 2 schematically shows a first profile of Dm during the various steps of the process in the case where the upper limit $V_{T\uparrow max}$ of the heating rate $V_{T\uparrow}$ of the first wall 21 is relatively low with respect to the temperature of the hot flue gases discharged from the furnace 1, so as to require, during the restarting step, a high flow rate Dm greater than the flow rate Dm during the heating step in order to prevent the first wall being thermally embrittled during the successive cycles of the process.

In the case of FIG. 3, the ratio between the upper limit $V_{T\uparrow max}$ of the heating rate $V_{T\uparrow}$ of the first wall 21 and the temperature of the hot flue gases discharged from the furnace 1 is higher, so that it is possible to use, during the restarting step, a flow rate Dm lower than the flow rate Dm during the heating step in order to prevent too rapid a heating of the first wall 21.

By thus safely carrying out a controlled cooling and a controlled heating of the first wall 21 between two heating steps, the invention makes it possible to benefit from the advantages of the preheating of the oxidant and/or of the fuel by indirect heat exchange with the discharged flue gases without experiencing unacceptable losses of time normally associated with the operational heating up and cooling of the heat exchanger(s).

As indicated above, it is essential that a cooling or a (re)heating up of the exchanger takes place gradually and in a controlled manner in order to prevent heat shocks that are capable of generating leaks in the heat exchanger. Such a cooling and heating up would therefore require a considerable time which generally exceeds the time needed for the unloading and the reloading of the furnace.

For this reason, the preheating of the oxidant and/or of the fuel upstream of the furnace by indirect exchange with the flue gases discharged from the furnace is not normally profitable for a batch furnace, the operation of which includes a shutdown step during each cycle.

It is also noted that the batch furnaces are generally of relatively small size compared to the sizes that continuous furnaces may reach for the same type of process: for example, batch glass melting furnaces compared to a float-type glass melting furnace. The investment in a plant for preheating by indirect exchange with the hot flue gases discharged is therefore relatively larger (compared to the price of the furnace and the production) for a batch furnace than for a continuous furnace. To date, the depreciation of the plant for preheating by indirect exchange was thus not possible over an acceptable duration for batch furnaces.

However, by safely carrying out a controlled cooling and a controlled heating of the first wall between two heating steps, the invention makes it possible to benefit from the advantages of the preheating of the oxidant and/or of the fuel by indirect heat exchange with the discharged flue gases without experiencing unacceptable losses of time normally associated with the operational heating up and cooling of the heat exchanger(s).

Thus, the present invention makes, for the first time, the preheating of the oxidant and/or of the fuel by indirect heat exchange with the flue gases efficient and profitable for batch furnaces.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a" "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising," "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A process for operating a furnace, said process comprising repeating a cycle of a heating step followed by a shutdown step and a restarting step, said heating step comprising the steps of:

supplying a fuel and an oxidant to the furnace whereby the furnace is heated by combustion of the supplied fuel with the oxidant with generation of heat and flue gases;

discharging the flue gases from the furnace through a duct; and preheating a fluid chosen from the fuel and the oxidant upstream of the furnace by:

introducing a flow rate Dm >0 of a liquid or gaseous medium into a chamber and heating said medium by heat exchange with the flue gases in the duct across a first wall which separates the medium in the chamber from the flue gases in the duct with a heated medium being obtained, and introducing a flow rate Df >0 of the fluid to be preheated into at least one line so as to preheat the fluid by heat exchange with the heated medium in the chamber across a second wall which separates the fluid in the at least one line from the heated medium in the chamber and which has a temperature referred to as operational temperature, wherein:

during the shutdown step, each of the supply of the fuel to the furnace, the supply of the oxidant to the furnace, the combustion of the fuel with the oxidant in the furnace, and the discharge of flue gases from the furnace through the duct are interrupted;

during the shutdown step, the flow rate Dm of the medium in the chamber does not exceed 50% of the flow rate Dm during the heating step;

during the restarting step, each of the supply of the fuel to the furnace, the supply of the oxidant to the furnace, the combustion of the fuel with the oxidant in the furnace, and the discharge of flue gases from the furnace through the duct are restarted;

during the restarting step, a flow rate Dm of the medium is introduced into the chamber which is greater than the flow rate Dm during the shutdown step; and during the restarting step, the flow rate Dm is regulated so as to limit the rate of heating of the first wall until the first wall reaches the operational temperature at the end of the restarting step.

2. The process of claim 1, wherein, during the shutdown step, the flow rate Dm=0.

3. The process of claim 1, wherein, during the restarting step, the flow rate Dm rises above the flow rate Dm during the heating step in order to then return to the flow rate Dm of the heating step at the end of the restarting step.

4. The process of claim 1, wherein, during the restarting step, the flow rate Dm does not exceed the flow rate Dm during the heating step.

5. The process of claim 1, wherein the flow rate Dm during the restarting step is regulated so that during the restarting step the first wall heats at a heating rate $V_{T\uparrow}$ which is less than or equal to a predetermined upper limit $V_{T\uparrow max}$.

6. The process of claim 1, wherein, during the restarting step, the flow rate Dm changes according to a predetermined function.

7. The process of claim 5, wherein, during the restarting step:

a temperature of the first wall is detected; and the flow rate Dm is regulated as a function of the heating rate $V_{T\uparrow}$ determined from the detected temperature.

8. The process of claim 1, wherein the heating step is a step of the treatment of a feedstock in the furnace.

9. The process of claim 8, wherein, during the shutdown step, the heated feedstock is discharged from the furnace and a feedstock to be heated is introduced into the furnace.

10. The process of claim 1, wherein the medium is a gaseous medium chosen from air, nitrogen, CO2 or steam.

11. The process of claim 1, wherein the fluid to be preheated is an oxidant with an oxygen content between 50 vol % and 100 vol %.

12. The process of claim 1, wherein oxidant and fuel are preheated during the heating step.

13. The process of claim 1, wherein the furnace is chosen from rotary furnaces for smelting of cast iron, rotary furnaces for smelting of nonferrous metals, tilting furnaces for smelting of nonferrous metals, rotary or tilting furnaces for smelting of enamels, and furnaces for smelting of metals of electric arc furnace type.

14. The process of claim 1, wherein the fluid to be preheated is the fuel and, during the restarting step, the fuel is split into two portions: a first portion and a second portion, wherein:

the first portion is supplied directly to the furnace without passing through the at least one line; and the second portion is supplied to the furnace after having passed through the at least one line.

15. The process of claim 14, wherein a ratio, between, the second portion of the fluid and the sum of the first portion of the fluid and the second portion of the fluid, increases during the starting step.

16. The process of claim 1, wherein the fluid to be preheated is the oxidant and, during the restarting step, the oxidant is split into two portions: a first portion and a second portion, wherein:

the first portion is supplied directly to the furnace without passing through the at least one line; and the second portion is supplied to the furnace after having passed through the at least one line.

* * * * *